UNITED STATES PATENT OFFICE.

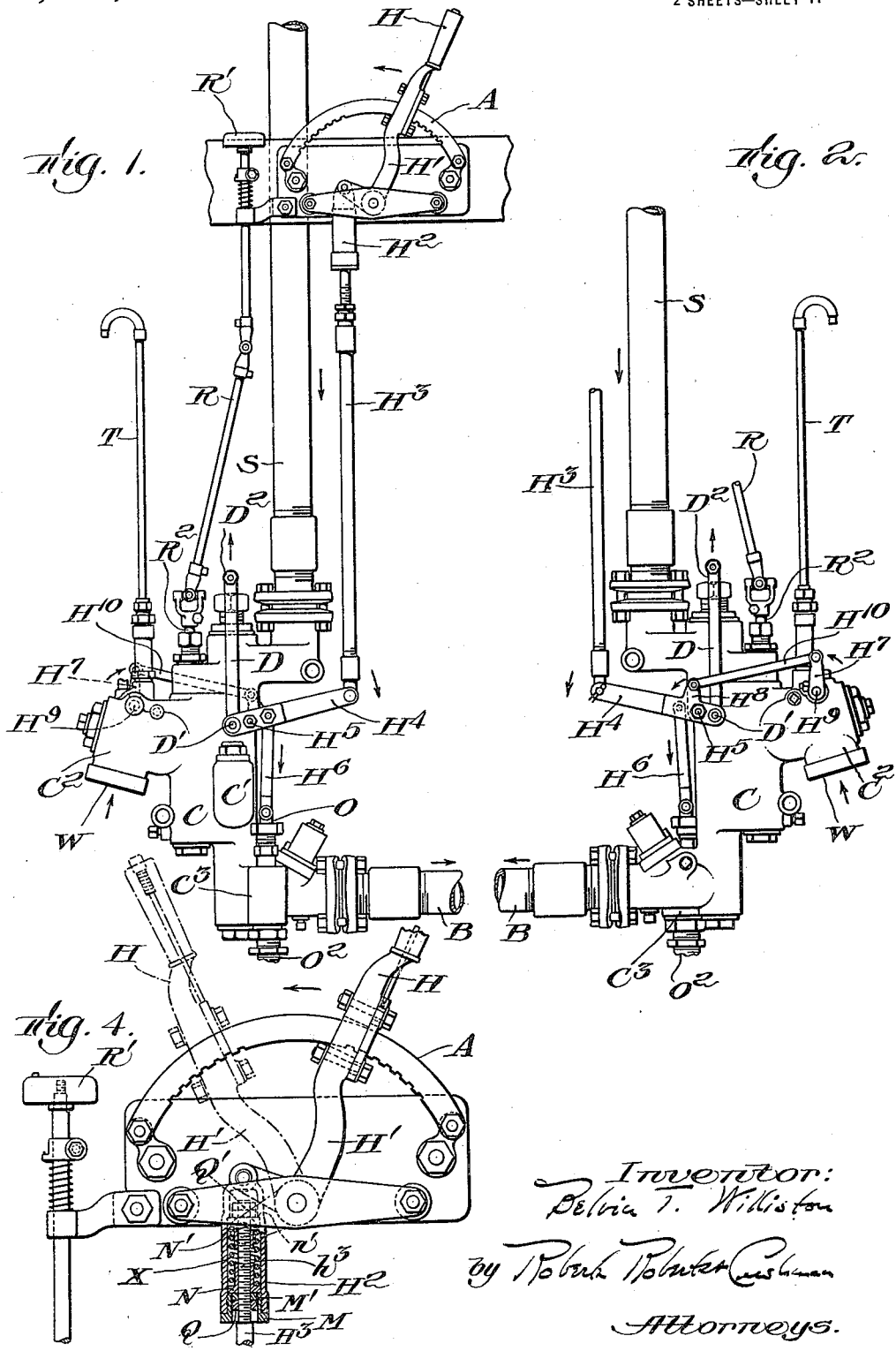

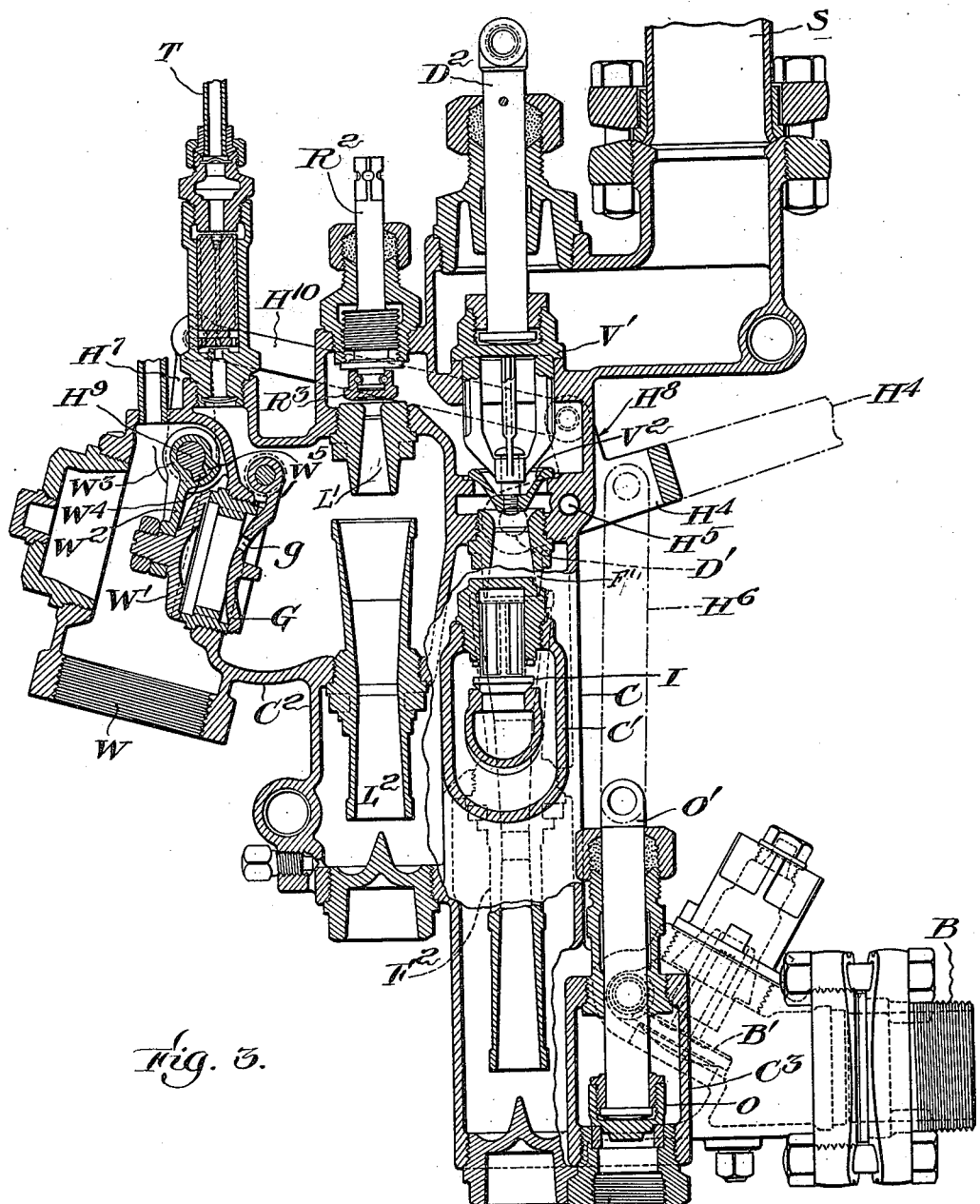

BELVIN T. WILLISTON, OF SOMERVILLE, MASSACHUSETTS, ASSIGNOR TO THE UNITED INJECTOR COMPANY, OF BOSTON, MASSACHUSETTS, A CORPORATION OF NEW YORK.

BOILER-FEEDING INJECTOR.

1,311,631.  Specification of Letters Patent.  Patented July 29, 1919.

Application filed January 7, 1918. Serial No. 210,631.

*To all whom it may concern:*

Be it known that I, BELVIN T. WILLISTON, a citizen of the United States, and resident of Somerville, in the county of Middlesex and State of Massachusetts, have invented new and useful Improvements in Boiler-Feeding Injectors, of which the following is a specification.

My invention relates to boiler feeding injectors, and its object is particularly to improve the system of control of locomotive injectors of the modern so-called non-lifting type, to insure against leakage or waste of water or steam through the injector at times when the injector is not operating, and to provide for securing closure of the final overflow valve of such an injector when the injector is in operation.

For illustration of my improvements I show them herein as applied to a double tube injector such as the commercially known Hancock inspirator in which, although the instrument may be used as a so-called non-lifter (namely, by being mounted at a level below that of the water tank from which the instrument is supplied) there are comprised two sets of tubes, one pair adapted to draw water from the supply tank and deliver it to the forcer pair, and the other pair, usually called the forcer tubes adapted to force the water thus supplied into the boiler.

On locomotive engines modern practice has for some little time favored the employment of such boiler feeding injectors as non-lifters, that is to say, in a position located outside and below the locomotive cab and also below the level of the water tank in the locomotive tender. This mode of mounting the boiler feeding injector as contrasted with the earlier mode of mounting the injector in the cab or immediately forward of the cab, necessitates a system of mechanical control connections somewhat more complicated and considerably larger than the older method of mounting required. The length of the mechanical members in such a system has involved sundry inconveniences which although of minor character, call for a remedy. Moreover, the location of the injector in a position below the level of the tank water has introduced liability to leakage and loss of water through the injector when it is not in operation and when therefore its final overflow valve is open furnishing an avenue of escape for water leaking from the tank through the injector unless, as has been the practice recently, the final overflow valve has been independently mounted and controlled so that it may be closed not only when the injector is in use as a boiler feeder, but also when the instrument is not in action. This expedient not only made it necessary to open the final overflow as a preliminary to boiler feeding, but also introduced liability of burning the suction hose whenever the injector steam valve leaked, since the only path for escape of such steam lay through the hose, egress through the final overflow valve being closed. This independent mounting and operation of the final overflow valve thus introduced inconveniences as contrasted with the previously accepted practice in which all of the operating valves, both steam and overflow, of the injector were attached to and controlled by a single mechanical operating system. By means of the improvements herein to be described the simplicity and convenience of the single handle control is restored while at the same time the disadvantages incident to such control when employed with the non-lifting type of locomotive injector, are obviated.

In the drawings hereto annexed which illustrate my improvements,—

Figure 1 shows in elevation a Hancock non-lifting locomotive inspirator with the various parts of its control system in their usual relation;

Fig. 2 is an elevation of that side of the boiler feeding injector opposite to that shown in Fig. 1;

Fig. 3 is a vertical section of the injector viewed from the same side as that shown in Fig. 1, and exposing to view the several operating parts in and immediately upon the injector or inspirator itself; and Fig. 4 is an elevational view in detail showing the single handle operating end of the injector control system.

Fig. 1 shows the general layout of the apparatus. The control handle H is located in the cab of the locomotive engine convenient to the hand of the engineer, and operates the bell crank lever H′ one arm of which swings upon the notched arc A and is provided with a convenient latch (not shown)

for securing the arm in position. The bell crank lever H' is joined to and operates the downwardly extending reach rod H³ which comprises the spring case H² which will presently be described more in detail. At its lower end the reach rod H³ is jointed to rocker arm H⁴, this latter being pivoted at H⁵ on casing C of the inspirator. At D' the double pitman D is jointed to the rocker arm H⁴, this pitman in turn controlling and operating the main valve stem D² which controls the movement of the steam admission valves of the inspirator. Various portions of the casing C, which are visible in Fig. 1, are the chamber C' for the intermediate overflow valve, the extension C² which constitutes the water inlet, the opening W being adapted to junction with the water pipe leading from the water tank. The lower extension C³ constitutes the housing for the final overflow valve, the final overflow itself taking place at the outlet O². The link H⁶, which is jointed to the rocker arm H⁴, is pivotally secured to and operates the final overflow valve stem O'. The universal joint rod R connects the handle wheel R' with the stem R² of a lifter steam regulating valve which is seen more clearly in Fig. 3. T is the telltale pipe which extends up into the cab of the locomotive engine and serves in a well known manner to give warning to the engineer if the injector should accidentally be interrupted in its operation or, as the saying is, "break". S is the main steam pipe which supplies the steam to the inspirator and B the pipe leading to the boiler through which feed water passes.

Certain portions of the operating mechanical system not visible in the view shown in Fig. 1, are more clearly exhibited in Fig. 2. On the side of the rocker arm H⁴, visible in the latter figure, there is a lateral projection H⁸ to which is pivotally joined the link H¹⁰, the latter being pivotally joined at its free end to the arm H⁷ which, in turn, is secured to the rocker shaft H⁹, which last member entering the portion of the casing marked C² is associated with and serves to operate the water valve hereinafter to be described.

Referring now to Fig. 3 in which the parts internal to the inspirator are shown in their relation to the external operating system above referred to, it will be observed that the principal operating factors of the instrument there shown are of a well known character. The stem D² which controls the compound steam valve, the compound valve itself with lifter steam valve member at V' and the forcer steam valve member at V², the lifter tubes L' and L², the forcer tubes F' and F², the automatic intermediate overflow valve I and the lifter regulating valve R³ are all shown in their characteristic relationship and constitute the well known group of operative factors present in the Hancock locomotive inspirator.

In this inspirator mounted as above described as a non-lifting instrument, the final overflow valve O is linked into the mechanical connecting and operating system by the link H⁶ instead of being independently controlled as has been the practice recently with inspirators mounted in the non-lifting position. Thus articulately associated with the mechanical control system, it is obvious that when the steam valves are closed, the final overflow valve is open and must remain open so long as the steam valves are closed. With the apparatus in this condition it is clear that water might find its way from the tank through the water inlet W and pass through the injector casing C and leak out without attracting the attention of the locomotive engineer, possibly to the extent of seriously depleting the water supply in the tank. In order to guard against this while at the same time conserving the operative advantages of a completely articulated control valve system, I have provided the water inlet valve W' which is controlled and operated by the rock shaft H⁹, this, as previously shown, being under the control of the crank arm H⁷, link H¹⁰ and rocker arm H⁴, etc. The water valve W' is mounted on a swinging arm W² which is sleeved over the rock shaft H⁹, the sleeve portion being lettered W³. On the rock shaft H⁹ there is a radial stud or feather W⁴ which projects into a slot W⁵ in the sleeve W³ and is circumferentially smaller than the slot W⁵. The lost motion provided for by this differential between the dimensions of the projection W⁴ and the slot W⁵, respectively, is provided for the purpose of accommodating the articulated parts here under description to changes in the positional relationship of the working members associated in the articulated system, such change in positional relationship for instance as will result when the steam valve V' is reground to its seat. Within practical limits such changes in positional relationship will not affect the final and secure seating of the water valve W'.

Inside of the water valve W there is provided the swing check valve G which if the injector should "break" while in operation, will automatically close and cause steam to be forced through the telltale T and thus inform the engineer that his boiler feeding injector has temporarily gone out of action. A small hole g is provided in the swing check G so that on occasion when it is desired to blow steam back into the tank water for heating purposes the steam may find a passage through this hole g. The usual check valve B' is provided at the inspirator end of the boiler feed pipe B.

It has been observed that with any articulated mechanical system of control involving members necessarily so long in part as those which are required for operating non-lifting locomotive injectors, the closure of the final overflow valve is not so secure as is desirable, these valves having manifested liability to chatter when, for proper operative purposes, they should be securely held on their seats. In order to exert a persistent stress upon all members of this articulated mechanical control system, and thus to guard against shaking and chattering and consequent wear, I provide at one point intermediate between the operating handle and the operated members, which means in effective practice between the operating end and the final overflow valve, an elastic member so arranged that when the operating handle is moved and latched in position for boiler feeding action by the injector or inspirator, the elastic member shall exert a persistent closure stress upon the final overflow valve. A convenient mode of introducing this elastic member is shown in detail in Fig. 4 where the upper end of the downwardly extending reach rod $H^3$ is screwthreaded at $h^3$ so as to receive the holding and adjusting nuts Q and Q'. Spring seats in the shape of sleeves N and N' are placed over the reduced and threaded portion $h^3$ and between the seating flanges of these sleeves there is placed the spring X. The end $h^3$ of the rod $H^3$ with the spring sleeve seats and nuts attached is slipped into the cylindrical spring casing $H^2$ in the lower end of which there is then screwed the thimble M the inner end of which provides a suitable seat at M' for the lower sleeve N, the upper sleeve N' finds a similar seat at $n'$ in the upper part of the spring casing $H^2$. Without further detailed explanation it will be observed that when the operating handle is drawn to its full operating position, the spring X will be compressed, the degree of its compression depending on how much in excess of the movement barely necessary to effect closure of the final overflow valve O, the operating lever H' is moved by means of the handle H. The stress produced by the excess movement of the operating handle exerts itself persistently upon the final overflow valve and holds the latter firmly and securely seated. Moreover, when the inspirator is shut off, by moving the handle H to its full line position shown in Fig. 4, the spring X is compressed and exerts an upward pull on the reach rod $H^3$, thus persistently straining the steam valve V' to its seat, preventing looseness, chattering, and leakage. By providing an elastic member which operates in either direction, the firm closure of either the main steam valve or the final overflow valve, is assured.

As the inspirator is brought into action by the progressive movements of the operating handle H, the first step in this operation is the opening of the water valve W' through the medium of the articulated mechanical system above described. Then the lifter steam enters the inspirator casing by the valve V' and the final overflow valve being still open and the intermediate overflow valve I operating as required the lifter tubes impel the stream of water through the chambers of the inspirator casing; as the operating handle moves still further the water valve W' opens still further and presently the forcer steam is admitted through the valve $V^2$ and finally the final overflow valve O reaches its seat. As more and more water is demanded by the increasing effect of the steam action in the injector tubes the more does the water valve W' open to admit the required supply. When the inspirator is no longer required and the operating handle is restored to the position of closure, the water valve W' descends upon its seat so that although the final overflow valve O is then open, there is no chance for water to leak through the inspirator casing.

I claim:

1. In a boiler feeding injector, the combination with a mechanical system of steam and overflow control, of a water supply closure valve and connections thereto, to open water communication with the operating factors in the injector as the operating steam is admitted, and a lost motion device in said connections to accommodate changes in positional relationship of members related to the mechanical system of control.

2. In a boiler feeding injector, the combination with the final overflow valve, of a water supply closure valve, and connections between the two said valves to insure the closing of one as the other is opened, and vice versa, and a lost motion device in said connections to accommodate changes in positional relationship of members associated with said connections.

3. In a boiler feeding injector, the combination with a mechanical system of valve control, of an elastic member inserted directly in said system between the operating end of the system and the final overflow valves, to exert persistent closure stress upon said final overflow valve.

4. In a boiler feeding injector, the combination with a mechanical system of steam and overflow control, of a water supply closure valve and connections thereto, to open water communication with the operating factors in the injector as the operating steam is admitted, and an elastic member inserted directly in said system between the operating end of the system and the final overflow valve, to exert persistent closure stress upon said final overflow valve.

5. In a boiler feeding injector, the combination with a mechanical system of steam and overflow control, of a water supply closure valve and connections thereto, to open water communication with the operating factors in the injector as the operating steam is admitted, and a lost motion device in said connections to accommodate changes in positional relationship of members related to the mechanical system of control, and an elastic member inserted directly in said system between the operating end of the system and the final overflow valve, to exert persistent closure stress upon said final overflow valve.

6. In a boiler feeding injector, the combination with a final overflow valve, of a water supply closure valve, and connections between the two said valves to insure the closing of one as the other is opened, and vice versa, and an elastic member inserted directly in said system between the operating end of the system and the final overflow valve, to exert persistent closure stress upon said final overflow valve.

7. In a boiler feeding injector, the combination with the final overflow valve, of a water supply closure valve, and connections between the two said valves to insure the closing of one as the other is opened, and vice versa, a lost motion device in said connections to accommodate changes in positional relationship of members associated with said connections, and an elastic member inserted directly in said system between the operating end of the system and the final overflow valve, to exert persistent closure stress upon said final overflow valve.

8. In a boiler feeding injector, the combination with a mechanical system of valve control, a steam valve and a final overflow valve, of an elastic device adapted to operate in either of two directions to exert persistent closure stress upon the steam valve or the final overflow valve, according to the direction in which said stress is exerted.

Signed by me at Boston, Massachusetts, this second day of January, 1918.

BELVIN T. WILLISTON.

Copies of this patent may be obtained for five cents each, by addressing the "Commissioner of Patents, Washington, D. C."